Sept. 23, 1952　　　　　W. A. MEIGHAN　　　　　2,611,638
BUNDLING CHOKER
Filed April 19, 1948　　　　　　　　　　　　　4 Sheets-Sheet 1
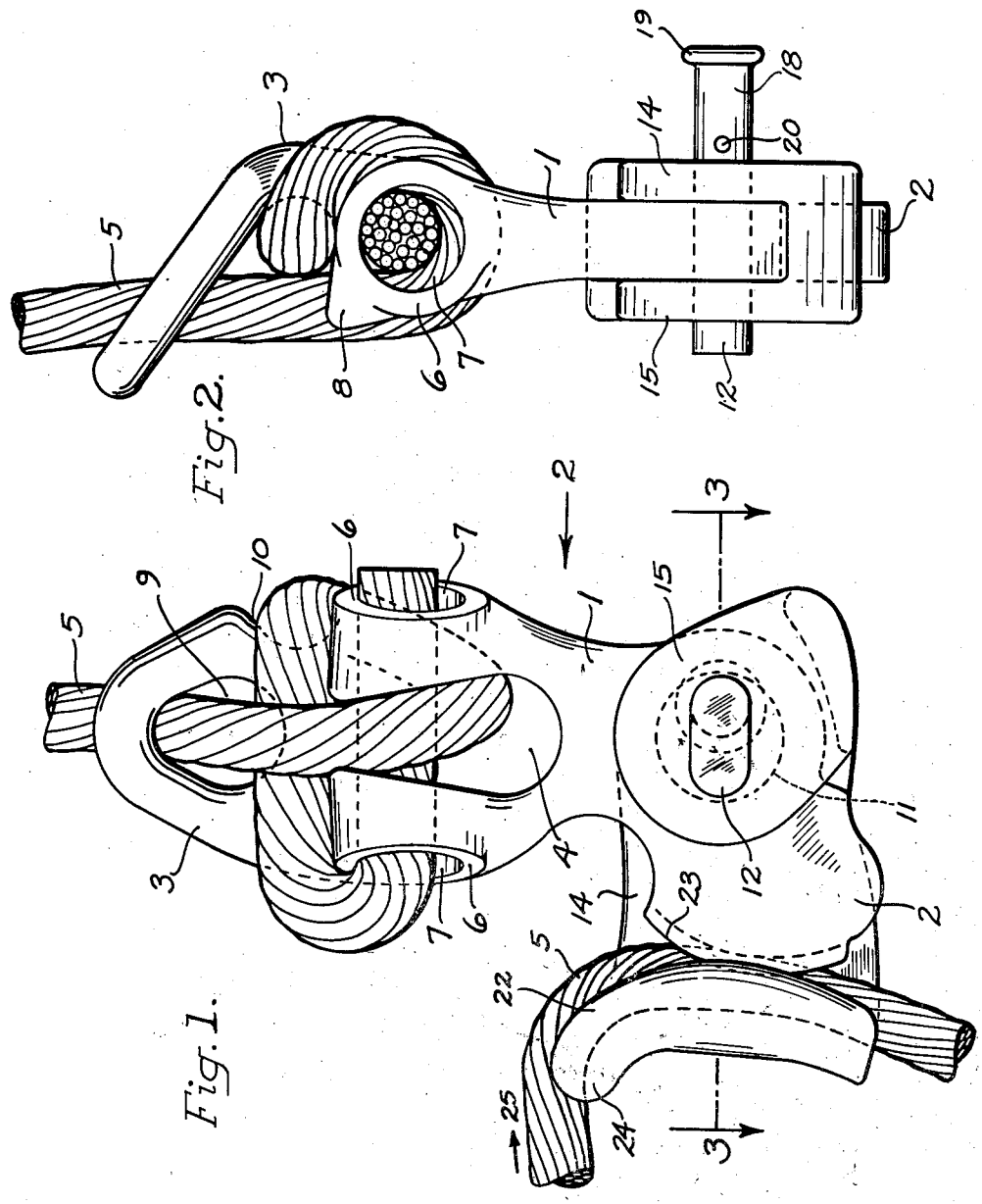
INVENTOR.
William A. Meighan
BY
Atty.

Sept. 23, 1952 — W. A. MEIGHAN — 2,611,638
BUNDLING CHOKER

Filed April 19, 1948 — 4 Sheets-Sheet 2

INVENTOR.
William A. Meighan
BY
Atty.

Sept. 23, 1952 W. A. MEIGHAN 2,611,638
BUNDLING CHOKER
Filed April 19, 1948 4 Sheets-Sheet 3
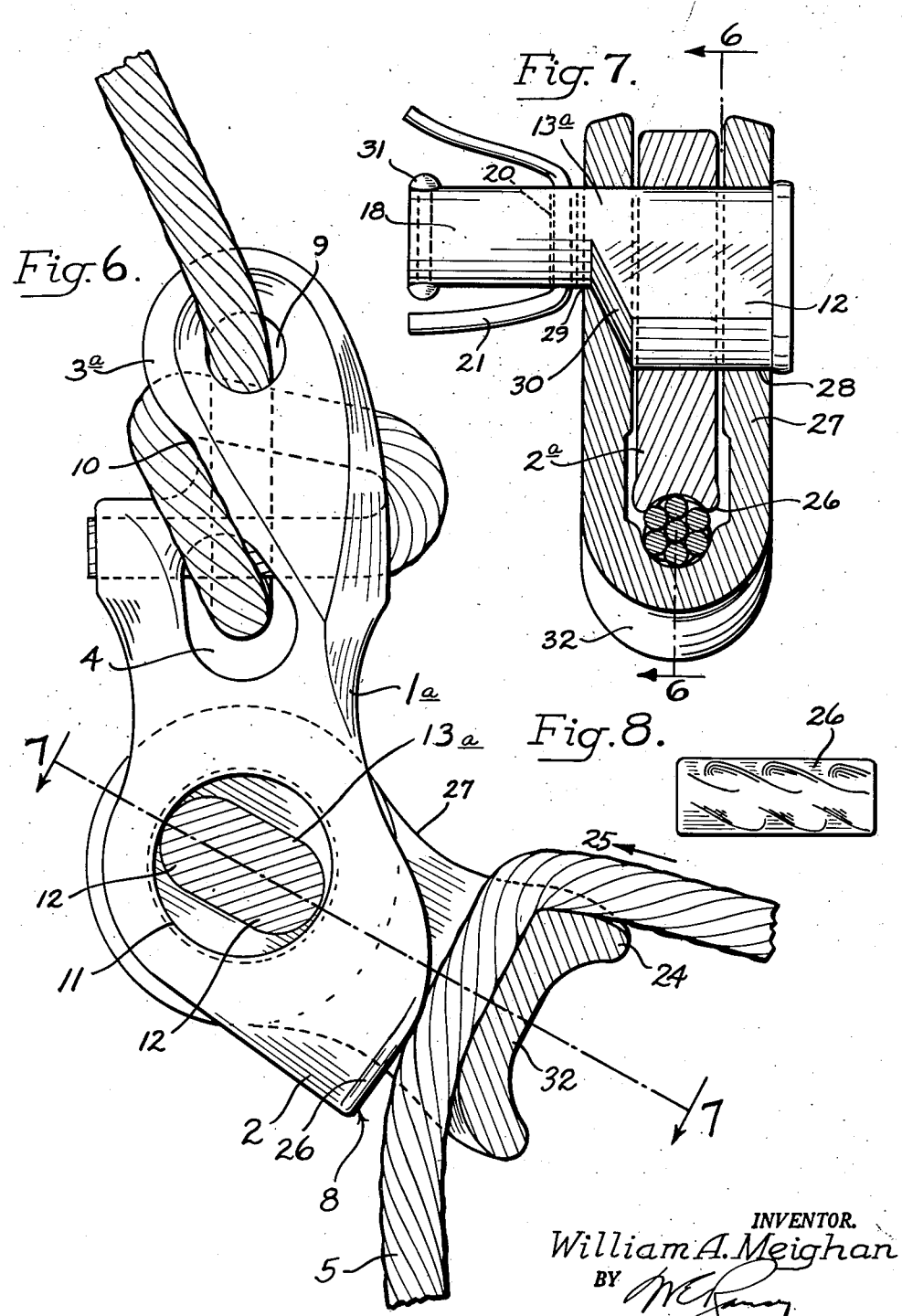
INVENTOR.
William A. Meighan
BY
Atty.

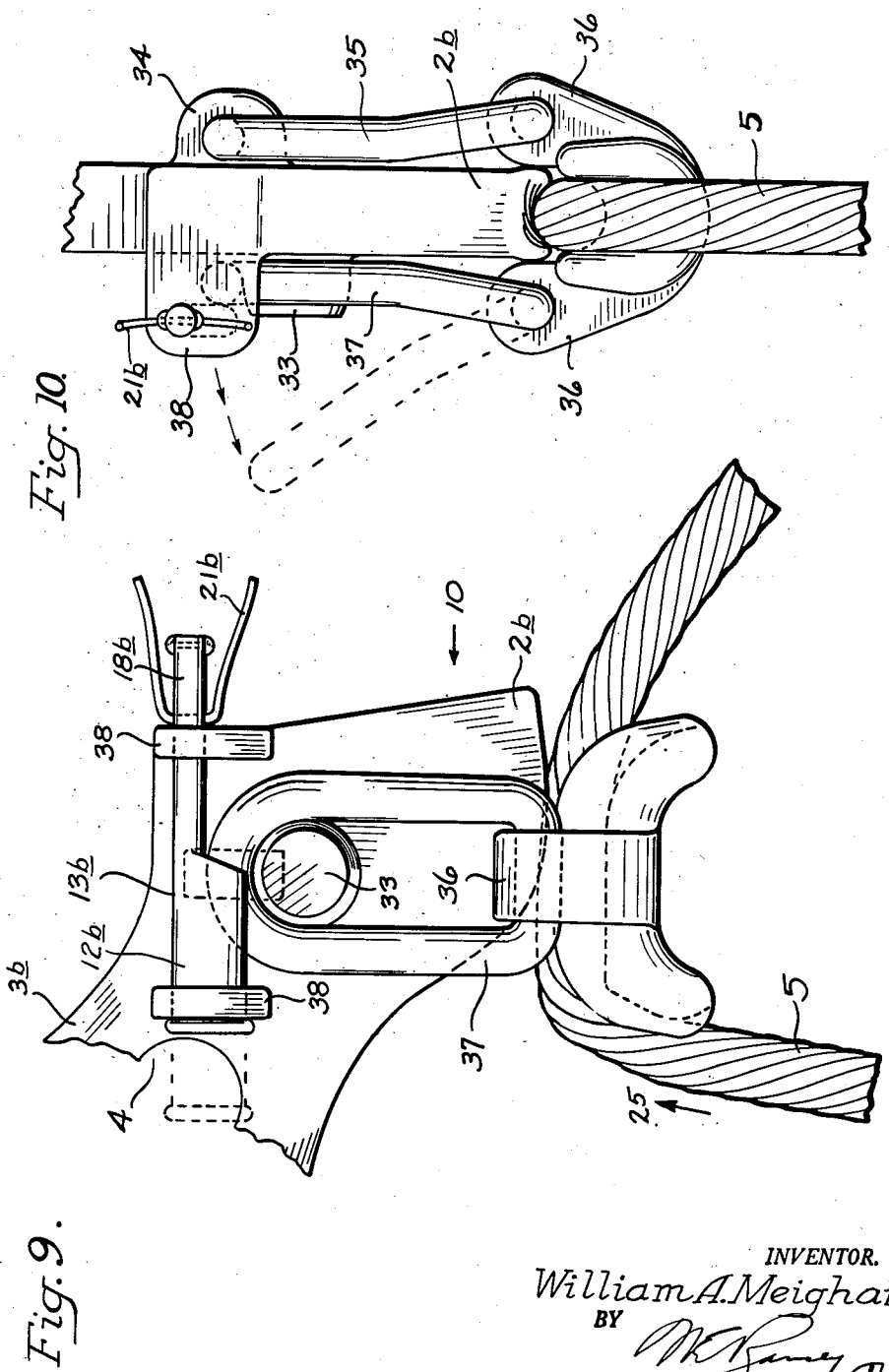

Patented Sept. 23, 1952

2,611,638

UNITED STATES PATENT OFFICE 2,611,638

BUNDLING CHOKER

William A. Meighan, Oswego, Oreg.

Application April 19, 1948, Serial No. 21,825

15 Claims. (Cl. 294—75)

This invention pertains to rope fittings, and relates particularly to novel means for detachably but positively holding a wire choker rope about an article or a bundle of articles such as logs, lengths of pulpwood, pieces of cordwood and the like.

In the logging industry, for example, choker ropes have long been used to drag cut timber from the forest to a water way or other convenient site from which the logs are transported to the mills. The ropes employed are necessarily large in cross section and are usually constructed of a number of wires woven into the form of a heavy cable to provide the strength required for such uses. These cables accordingly are stiff and resistant to bending, thus causing considerable difficulty in the formation of knots therein or in otherwise manipulating them during attachment to such devices as terminal fittings and choker hooks. This difficulty heretofore has been avoided by attaching closed loops or ferrules to the end of the rope by means of clamps, solder, babbitt, etc., which loops or ferrules served as means for attaching the end of the rope to a hook or other device slidably mounted on the rope. Not only does this procedure necessitate the use of special equipment which must be made available at the logging site, but the fastening means thus provided does not afford a positive grip for securing and holding the timbers or logs in a tight bundle.

This latter disadvantage is of particular concern in present day logging operations. With the sharp decline in the quantity of available timber, it has become necessary to salvage cordwood, pulp logs, second growth timber and water soaked lengths and other wood of relatively short lengths which are of use in the manufacture of paper pulp, cardboards and other commodities made from ground or defibered woods. Economic factors prohibit the handling of such wood in individual pieces, and the choker ropes heretofore employed are incapable of positively securing and maintaining a bundle of such logs in compact form during the logging and freighting operations. This is because the choker ropes maintain a relatively firm hold on the logs only while sufficient tension is maintained upon the drag line extending from the choker loop. Also when a bundle of logs is being dragged over the ground, any relaxation in the tension of the line immediately loosens the grip of the choker, and some of the logs may slip away from the bundle, or the latter may otherwise be disarranged. Moreover, even if the bundle of logs is successfully hauled from the forest to the site where the logs are to be loaded onto freight cars, or onto logging trucks, or into a water way for subsequent transport, the hold on the bundle is relaxed when the drag line is removed.

It is a principal object of this invention to provide a choker assembly in which one end of a choker rope is tied to a choker hook to which an intermediate portion of said rope may be releasably engaged but which engagement may not be relaxed except after positive manual manipulation.

Another important object of the invention is to provide in a choker hook a clamp comprising cooperating jaws constructed and arranged detachably to receive an intermediate section of choker rope and to resist movement of said rope therein in the direction producing increase in the size of the choker loop until and unless positive disengagement is effected.

A further object is to provide in a choker hook, a clamp for detachably retaining a choker rope in which clamp the gripping and releasing of said rope is accomplished by the manual movement of a pin having sections of different effective diameters.

Other objects and advantages of the present invention will appear from the following detailed description taken in connection with the accompanying drawings, in which:

Fig. 1 is a front elevation of the choker hook embodying the present invention showing portions of wire rope engaged therewith;

Fig. 2 is a side elevation of the device shown in Fig. 1, viewed in the direction of arrow 2 in Fig. 1;

Fig. 6 is an elevation, partly in section, of a modified form of clamp taken along the line 6—6 of Fig. 7, also showing short sections of wire rope associated with said clamp;

Fig. 7 is a sectional view of said modified form of clamp taken along the line 7—7 of Fig. 6;

Fig. 8 is a plan view of the engaging face of the clamp shoe of said modified clamp viewed in the direction of the arrow 8 in Fig. 6;

Fig. 9 is a fragmentary front elevation illustrating a further modification of a clamp embodying the present invention; and Fig. 10 is a side elevation of the further modification shown in Fig. 9, as viewed in the direction of the arrow 10 in Fig. 9, portion being shown in broken outline to illustrate the manner in which the clamp is disengaged from a wire rope.

Figure 3:
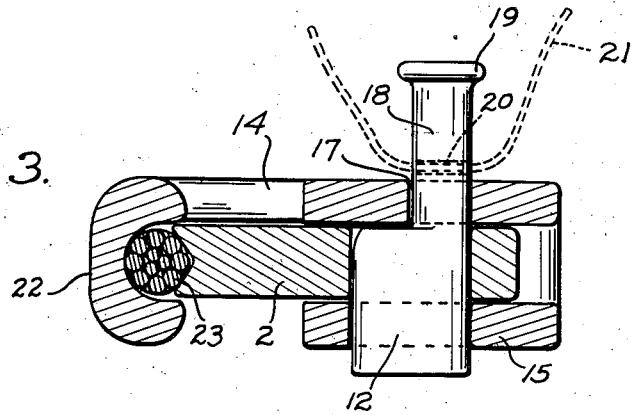
Fig. 3 is a sectional view of the clamp of the present invention taken along the line 3—3 of Fig. 1.

In a bundling choker embodying my invention, referring particularly to the form it takes as illustrated in Figs. 1, 2 and 6 of the drawings, an integral body 1 defines a clamping cam or clamping cam member 2 at one end thereof and an offset coupling member or rope coupling means 3 at the opposite end. The coupling member illustrated is substantially V-shaped in side elevation, as is shown in Fig. 2. The lower portion thereof, i. e. the portion adjacent the clamping cam member, is offset rearwardly from the plane of the clamp, while the upper, or terminal end of the coupling member is bent forwardly to incline over the lower portion. The central portion of the coupling member adjacent the clamping cam member is recessed, defining an aperture 4 through which the line 5 is threaded for attachment to the coupling.

Formed in the side sections adjacent said aperture 4 and projecting normally from the plane of the body 1 are a pair of spaced tunnels or eyes 6 defining axially alined bores 7 for receiving the line to be anchored. The opposed faces of the tunnels or eyes are inclined toward each other at opposite sides of aperture 4 to form fingers 8 which serve to restrain the line from moving laterally within the aperture. The upper, or terminal, portion of the coupling member overlying the lower portion also is provided with an eye 9 arranged centrally therein. A groove 10 is formed in one of the edges of said upper portion adjacent one tunnel 6 to provide a guide channel in which one portion of the line 5 may be laid.

In attaching the line 5 to the coupling member, the end of the line is threaded through the eye 9 and thence rearwardly through the aperture 4. The line then is flexed upwardly to lie in the groove 10 and to wrap around the coupling in back of the line emerging from the eye 9 to rest in the apex of the V formed by the upper and lower portions of the coupling member. The line then is threaded through the pair of tunnels 6 within the loop formed by the line passing upwardly through the eye 9. This type of knot, and the procedure for forming it, is more fully described in U. S. Letters Patent No. 2,240,510 issued to me on May 6, 1941, and entitled Logging Choker and Fitting Therefor, in which patent the above discussed coupling is fully described and claimed. Said coupling is disclosed herein as being a preferred type of fitting, although not critical to the proper operation of a choker assembly embodying my present invention. Such other well-known fittings as, for example, a closed eye, loop and hook, or ferrule-type connection may readily be adapted for use with the assembly of the present invention, provided one of the connecting parts be formed integrally with the clamping member 2 previously mentioned.

In the embodiment illustrated in Figs. 1 to 5, inclusive, the clamping cam or clamping cam member 2 is offset at a right angle to the longitudinal axis of the elongated coupling member 3. A transverse hole 11 is formed in the rearward portion of said member adjacent the coupling member, said hole being of sufficient diameter to receive the enlarged end 12 of the pin 13, the function of which is explained hereinafter. A gripping or jaw member 14 is provided at its rearward end with a bearing flange 15 spaced laterally from the remainder of the gripping member to provide a slot into which an intermediate portion of the clamping cam member 2 is received. The two spaced portions of the gripping member 14 thus define spaced flanges for receiving an intermediate section of said clamping cam member. An elongated slot 16 is formed in said bearing flange 15 to receive the enlarged end of the pin 13, while a hole or slot 17 is provided in the other spaced flange, as defined by the gripping member 14 to receive the reduced end 18 of the pin. This structure, in a broad sense, is a quick detachable means as hereinafter will appear.

Figure 4:
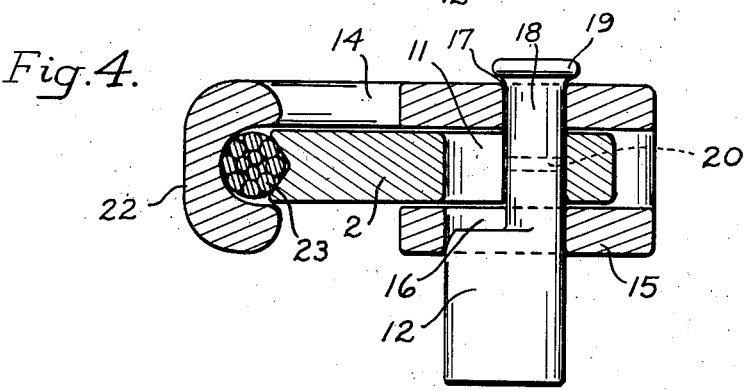
Figs. 4 and 5 are sectional views similar to Fig. 3, showing the sequential steps involved in effecting release of the clamp of the present invention.
Figure 5:
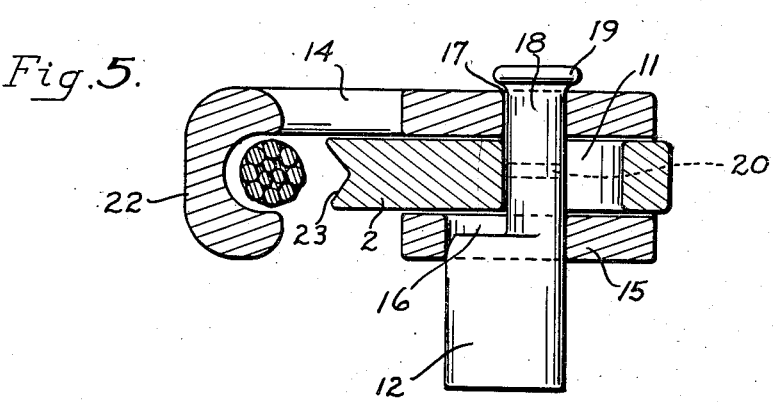

As shown in Figs. 3 to 5, inclusive, the clamping cam portion of the body 1 is placed in the slot between the bearing flange and the gripping member 14, and the pin 13 is inserted transversely through the elongated slot 16, the hole 11 and the hole 17 pivotally to secure the body of the gripping member. The reduced end of the pin 13 is then enlarged at its end to form a shoulder 19 which prevents the pin from being separated from the gripping member 14. A hole 20 is drilled transversely through the reduced end of the pin at a position adjacent the outer face of the gripping member 14 when the pin is in full locking position, as shown in Fig. 3 of the drawings, to receive a wire 21, or other keeper, such as a cotter pin. This wire insures against accidental displacement of the pin by preventing the enlarged end of the pin from moving out of the hole 11. In choker assemblies for use with light ropes the pin 13 may be merely tapered, rather than stepped, as heretofore described, and the holes provided in the flanges may be constructed to correspond to the dimensions of the pin.

The free end of the gripping member 14 is formed in the shape of a saddle 22 which faces and cooperates with the curved convex shoe or tongue 23 forming the end of the offset clamping cam member 2 for releasably gripping an intermediate section of the choker rope 5, the end of which is secured to the coupling member 3. The inner surface of the saddle is curved sharply outward at its receiving end 24 for purposes presently to be explained.

In the operation of the choker assembly hereinabove described, the end of the choker rope is secured to the coupling member 3, in the manner before discussed, and the rope is looped about the log or bundle of logs or other articles to be handled. With the pin 13 in the locking position and the wire keeper 21 affixed as shown in Fig. 3, the gripping member 14 is rotated away from the shoe 23 sufficiently to introduce an intermediate section of the rope into saddle 22. The free end of the rope, which has been provided with a terminal fitting such as the type disclosed and claimed in the U. S. patent referred to hereinbefore, is then secured to a drag line. As the drag line exerts a pull upon the choker rope, the latter slides through the saddle 22 in the direction of the arrow 25, thereby decreasing the diameter of the choker loop encompassing the bundle.

When the articles are brought into such a compact bundle as to prevent further closing of the choker loop, the outward pressure exerted by the bundle upon the rope overlying the receiving end 24 of the saddle and upon the coupling member 3 tends to force the saddle 22 and the gripping member 14 downwardly, as viewed in Fig. 1, into axial alignment with the longitudinal axis of the coupling. By this downward movement the rope frictionally is gripped between the saddle and the shoe 23, and the bundle is retained in compact form. Moreover, the pressure exerted by the bundle upon the rope overlying the sharply curved receiving end 24 of the saddle 22 produces a sharp, but not shearing, bend in the rope which fits closely against the saddle. It has been discovered that this close union at the sharp bend greatly increases the holding power of the clamp.

Logs, for example, thus tightly bundled may thereafter be hauled from the forest to the shipping site, and the drag line released. Since the outward pressure of the bundle maintains the clamp in positive gripping position, it is apparent that no tension need be maintained upon the free end of the choker rope. The bundle thus formed may be loaded upon trucks or freight cars, or discharged into a water way, for transport to the mill for processing.

When it is desired to release the bundle, the keeper wire 21 is removed from the hole 20 in the reduced end of the pin, and the workman applies a sharp blow with a hammer upon the shouldered end of the pin. This drives the pin from its locking position, as shown in Fig. 3, to its fully released, or retracted, position as shown in Figs. 4 and 5. Generally, the instant that the enlarged end 12 of the pin is withdrawn from the hole 11 in the clamp 3, as in Fig. 4, the latter immediately springs rearwardly the length permitted by the reduced end 18 of the pin, thus releasing its grip upon the choker rope disposed in the saddle 22. The choker assembly is then withdrawn from about the logs and returned to the logging site for further use.

The modification illustrated in Figs. 6, 7 and 8 of the drawings is similar in general structure to the embodiment previously described. It comprises a main body 1a forming a clamping cam member 2a and a coupling member 3a cooperating with a gripping member pivotally secured thereto by means of the pin 13a. The clamping member cam 2a, however, is offset from the longitudinal axis of the coupling member at an angle of about 30°, rather than the 90° as in the first construction described. The shoe 26 formed at the end of the member 2a is substantially flat along its length, and is concaved across its face. As shown in Fig. 8 of the drawings, the shoe face may be imprinted with the design of the convolutions of strands comprising a cable or rope, thereby effecting greater gripping action. That is, the shoe face may have formed therein an intaglio representation of the peripheral surface of the wire rope. Other features of the body of the choker hook illustrated in Figs. 6, 7 and 8 are given similar reference characters and perform similar functions to the embodiment in Figs. 1 to 5, inclusive.

The gripping or jaw member employed in this modification comprises a U-shaped member 27 provided at one of its free ends with an elongated slot 28 and at the other of its free ends with a bore 29. The bore is tapered outwardly towards its inner end to provide a seat for the sloping face 30 joining the enlarged end 12 and the reduced end 18 of the pin 13a. A rivet 31 is secured to the end of the reduced section 18 of the pin to provide shoulder means for retaining the pin in the gripping member. The wire keeper 21 is provided for purposes discussed hereinbefore. The closed end 32 of the U-shaped member is formed in the shape of a saddle, the receiving end 24 being curved sharply outward for purposes previously explained.

The operation of this modified form of clamp is the same as that of the structure illustrated in Figs. 1 to 5, and described heretofore, with the exception that the choker rope 5 must be threaded through the space between the closed end 32 and the shoe or tongue 26. Upon releasing the grip upon the rope by driving the pin from its locking position, the rope cannot fly loose from the clamp, as is possible in the construction formerly described.

In the modification shown in Figs. 9 and 10 of the drawings, a pivot lug 33 projects laterally from one side of the clamping cam member 2b adjacent the coupling member 3b. A bearing flange 34 extends laterally from the opposite side of the clamp 2b and receives one end of a link 35. The opposite end of said link is pivotally mounted in one end of a saddle 36, which curves about the shoe 26 formed in the free end of the clamping member 2b to define a gripping or jaw member. One end of a second link 37 is pivotally mounted in the opposite end of the saddle while the opposite end of said link is constructed and arranged to detachably engage the pivot lug 33. Disposed above said pivot lug and to either side thereof are spaced flanges 38 likewise projecting from the side of said clamp 3b. One of said flanges is provided with an elongated slot to receive the enlarged end 12b of the pin 13b, which may overlie the link 37 in locking position, while the other flange is bored to receive the reduced end 18b of said pin as shown in Fig. 9, the pin 13b is of substantially the same construction as the pin illustrated in Fig. 6. The central portion of the saddle is formed in the shape of the saddle members 22 and 32, previously described, for receiving the choker rope 5 and for cooperating with a shoe or tongue as previously described.

In operation, wire 21 is removed and pin 13b is retracted, as shown in the dotted line of Fig. 9, whereby link 37 may be released from the pivot lug 33, as shown in the dotted lines in Fig. 10. The saddle thereupon swings downwardly about the end connected to link 35, and the choker rope 5 may be placed in position. The link 37 is then replaced upon the pivot lug and the pin 13b drawn into the locking position shown in full lines in Fig. 9 and the wire 21b replaced, thereby securing the link upon the pivot lug. After the choker rope has been manipulated about a log or group of logs by the procedure hereinbefore described, and the release of the choker rope is desired, the wire 21b is removed and the pin 13b driven from its locking position. With the pin no longer restraining the link 37, the latter slides from its position upon the pivot lug and releases the choker rope.

I claim:

1. A choker fitting comprising a body having means for securing the end of a wire rope choker thereto, a pivotally secured jaw member and a pivot pin arranged in an eye in said body for joining said body and said jaw member together, said body having a tongue operatively arranged to lie within said jaw member and adapted in one position with said jaw member to pinch and to hold an intermediate section of said wire rope choker between them, said pivot pin having two effective thicknesses, one traversing substantially the entire diameter of said eye, and another traversing only a portion of said diameter, said pivot pin being shiftable to bring said different thicknesses into successive effective relationships with said eye, whereby when the first thickness is in effective relation with its eye, said tongue and jaw members are spaced apart a distance effectively to pinch and to hold said wire rope, and when the second thickness is in effective relation, said tongue and jaw members are spaced apart sufficiently to free said rope from seizure between said tongue and said jaw member.

2. A choker fitting comprising a body having means for securing the end of a wire rope choker thereto, a pivotally secured jaw member and a pivot pin arranged in an eye in said body for joining said body and said jaw member together, said body having a tongue operatively arranged to lie within said jaw member and adapted in one position with said jaw member to pinch and to hold an intermediate section of said wire rope choker between them, said pivot pin having two effective thicknesses, one traversing substantially the entire diameter of said eye, and another traversing only a portion of said diameter, said pivot pin being shiftable longitudinally to bring said different thicknesses into successive effective relationships with said eye, whereby when the first thickness is in effective relation with its eye, said tongue and jaw members are spaced apart a distance effectively to pinch and to hold said wire rope, and when the second thickness is in effective relation, said tongue and jaw members are spaced apart sufficiently to free said rope from seizure between said tongue and said jaw member.

3. A choker fitting comprising a body having means for securing the end of a wire rope choker thereto, a pivotally secured jaw member and a pivot pin arranged in an eye in said body for joining said body and said jaw member together, said pivot pin having two effective thicknesses, said body having a tongue extending laterally therefrom, operatively arranged to lie within said jaw member and adapted in one position with said jaw member to pinch and to hold an intermediate section of said wire rope choker between them, one edge of said jaw member defining an abrupt angle to form a sharp bend in said wire rope choker, said pivot pin being shiftable to bring said different thicknesses into successive effective relationships with said eye, whereby when the first thickness is in effective relation with its eye, said tongue and jaw members are spaced apart a distance effectively to pinch and to hold said wire rope, and when the second thickness is in effective relation, said tongue and jaw members are spaced apart sufficiently to free said rope from seizure between said tongue and said jaw member.

4. A choker fitting comprising a body having means for securing the end of a wire rope choker thereto, a pivotally secured jaw member and a pivot pin arranged in an eye in said body for joining said body and jaw member together, said pivot pin having two effective thicknesses, said body having a cam-shaped tongue extending laterally therefrom operatively arranged to lie within said jaw member and adapted in one position with said jaw member to pinch and to hold an intermediate section of said wire rope choker between them, one edge of said jaw member defining an abrupt angle to form a sharp bend in said wire rope choker, said pivot pin being shiftable to bring said different thicknesses into successive effective relationships with said eye, whereby when the first thickness is in effective relation with its eye, said tongue and jaw members are spaced apart a distance effectively to pinch and to hold said wire rope, and when the second thickness is in effective relation, said tongue and jaw members are spaced apart sufficiently to free said rope from seizure between said tongue and said jaw member.

5. A choker assembly comprising, a choker rope, a terminal fitting on one end thereof, and a choker hook on the opposite end of said rope, said choker hook comprising, a clamping member, rope coupling means on one end of said clamping member, rope gripping means on the opposite free end of said clamping member, a gripping member having spaced flanges at one end thereof for receiving an intermediate section of said clamping member therebetween, a pin having a plurality of effective diameters throughout its length, transverse openings in said flanges having different effective diameters for slidably receiving said pin, an opening intermediate the ends of said clamping member alining with the transverse openings in said flanges and having a diameter substantially equal to the largest effective diameter of said pin for receiving said pin therethrough, removable keeper means in said pin for retaining the latter in locking position, shoulder means on the reduced end of said pin for retaining said pin in said cam member, and saddle means on the opposite end of said gripping member opposing the free end of said clamping member and cooperating therewith for releasably securing an intermediate portion of the choker rope therebetween to permit decreasing the diameter of a choker loop thus formed and to releasably resist the enlarging of said loop.

6. A choker hook comprising, in combination, a clamping member, rope gripping means on the opposite free end of said clamping member, a gripping member having spaced flanges at one end thereof for receiving an intermediate section of said clamping member therebetween, a pin having an elongated transverse section and a reduced transverse section, an elongated slot in one of said flanges and a reduced opening in the opposite flange for slidably receiving said pin, an opening intermediate the ends of said clamping member aligning with the transverse openings in said flanges and having a diameter substantially equal to the largest effective diameter of said pin for reeciving said pin therethrough, and saddle means on the opposite end of said gripping member opposing the free end of said clamping member and cooperating therewith for releasably securing an intermediate portion of the choker rope therebetween.

7. A choker hook as in claim 6 wherein said saddle means is spaced longitudinally from one of said flanges to define a lateral opening through which said choker rope intermediate portion selectively may be released.

8. A choker hook comprising, in combination, a clamping member, rope gripping means on one end of said clamping member, rope gripping means on the opposite free end of said clamping member, a U-shaped member having spaced free ends for receiving an intermediate section of said clamping member therebetween, a pin having an elongated transverse section and a reduced transverse section, an elongated slot in one of the free ends of said U-shaped member and a reduced opening in the opposite free end for slidably receiving said pin, an opening intermediate the ends of said clamping member aligning with the transverse openings in said flanges and having a diameter substantially equal to the largest effective diameter of said pin for receiving said pin therethrough, and saddle means in the closed end of said U-shaped member opposing the free end of said clamping member and cooperating therewith for releasably securing an intermediate portion of the choker rope therebetween.

9. A choker hook comprising, in combination, a clamping member, rope coupling means angularly disposed on one end of said clamping member, a member having spaced flanges at one end thereof for receiving an intermediate section of said clamping member therebetween, a pin having a plurality of effective diameters throughout its length, transverse openings in said flanges having different effective diameters for slidably receiving said pin, an opening intermediate the ends of said clamping member alining with the transverse openings in said flanges and having a diameter substantially equal to the largest effective diameter of said pin for receiving said pin therethrough, removable keeper means in the reduced section of said pin for retaining the latter in locking position, and saddle means on the opposite end of said member opposing the free end of said clamping member and cooperating therewith for releasably securing an intermediate portion of the choker rope therebetween.

10. A choker hook comprising, in combination, a clamping member, rope coupling means on one end of said clamping member, a U-shaped member having spaced free ends for receiving an intermediate section of said clamping member therebetween, a pin having a plurality of effective diameters throughout its length, transverse openings in the free ends of said U-shaped member having different effective diameters for slidably receiving said pin, an opening intermediate the ends of said clamping member alining with the transverse opening in said flanges and having a diameter substantially equal to the largest effective diameter of said pin for receiving said pin therethrough, shoulder means on the reduced end of said pin for retaining said pin, and saddle means in the closed end of said U-shaped member opposing the free end of said clamping member and cooperating therewith for releasably securing an intermediate portion of the choker rope therebetween.

11. A choker hook comprising an elongated body having rope coupling means at one end, a saddle means pivotally joined to said body intermediate the ends of the latter, and a cam-shaped member fixed to the other end of said body, said cam-shaped member lying within said saddle and cooperating with said saddle to engage a rope between them, said saddle means being swingable selectively about an axis to at least two different positions, in one of which it is in close proximity to said cam-shaped member, and in gripping relationship therewith, and in the other to be spaced therefrom, to be out of gripping relationship therewith, and a pin extending laterally of said body constituting the pivotal joining connection between said body and said saddle means.

12. A choker hook as in claim 11 wherein the swinging of said saddle means out of gripping relationship with said cam-shaped member exposes a lateral opening through one side of said body intermediate the cooperating portions of said saddle and cam-shaped member.

13. A choker hook comprising an elongated body having rope coupling means at one end, a saddle means pivotally joined to said body intermediate the ends of the latter, and a cam-shaped member fixed to the other end of said body, said cam-shaped member lying within said saddle and cooperating with said saddle to engage a rope between them, said saddle means being swingable selectively about an axis to at least two different positions, in one of which it is in close proximity to said cam-shaped member, and in gripping relationship therewith, and in the other to be spaced therefrom, to be out of gripping relationship therewith, a pin extending laterally of said body constituting the pivotal joining connection between said body and said saddle means, and quick detachable means associated with said pin for relaxing the gripping relationship of the saddle with the cam-shaped member.

14. A choker hook comprising an elongated body having rope coupling means at one end, a saddle means pivotally joined to said body intermediate the ends of the latter, and a cam-shaped member fixed to the other end of said body, said cam-shaped member lying within said saddle and cooperating with said saddle to engage a rope between them, said saddle means being swingable selectively about an axis to at least two different positions, in one of which it is in close proximity to said cam-shaped member, and in gripping relationship therewith, and in the other to be spaced therefrom, to be out of gripping relationship therewith, and a pin extending laterally of said body constituting the pivotal joining connection between said body and said saddle means, the face of said cam-faced member defining an intaglio recess complementary to the peripheral surface of said wire rope.

15. In a gripping element comprising an elongated body, a clamping member, a pin extending laterally of said body and pivotally joining said clamping member to said body and a cam-shaped member forming a part of said body and lying within said clamping member and forming therewith a pair of opposed gripping jaws, said clamping member being swingable about said pin to at least two different positions, in one position said gripping jaws being in close proximity to each other and in the other being spaced apart, the combination therewith of quick detachable means independent of the swing of said clamping means for releasing said opposed jaws and permitting them to move from said first mentioned position to the second mentioned position.

WILLIAM A. MEIGHAN.

REFERENCES CITED

The following references are of record in the file of this patent:

UNITED STATES PATENTS

| Number | Name | Date |
| --- | --- | --- |
| 332,619 | Moles | Dec. 15, 1885 |
| 702,334 | Schulte et al. | June 10, 1902 |
| 1,720,069 | Yeaton | July 9, 1929 |
| 2,053,018 | Bell | Sept. 1, 1936 |
| 2,217,042 | Bowman | Oct. 8, 1940 |
| 2,416,733 | Berndt | Mar. 4, 1947 |

FOREIGN PATENTS

| Number | Country | Date |
| --- | --- | --- |
| 329,439 | Great Britain | May 22, 1930 |
| 353,946 | Great Britain | July 29, 1931 |